UNITED STATES PATENT OFFICE.

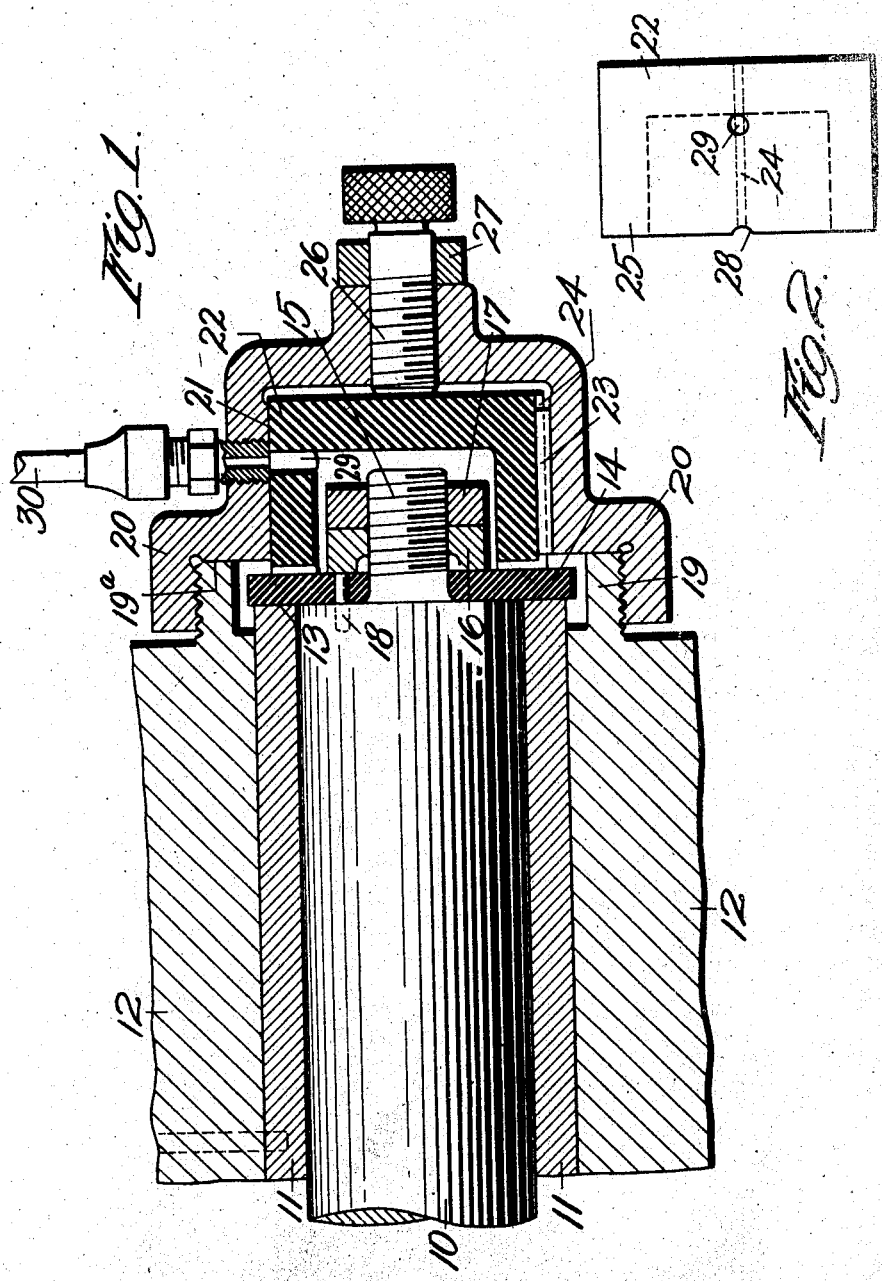

CHARLES H. NORTON, OF WORCESTER, MASSACHUSETTS, ASSIGNOR TO NORTON GRINDING COMPANY, OF WORCESTER, MASSACHUSETTS, A CORPORATION OF MASSACHUSETTS.

THRUST-BEARING.

1,189,861.  Specification of Letters Patent.  Patented July 4, 1916.

Application filed April 28, 1915. Serial No. 24,563.

*To all whom it may concern:*

Be it known that I, CHARLES H. NORTON, a citizen of the United States, residing at Worcester, in the county of Worcester and State of Massachusetts, have invented a new and useful Thrust-Bearing, of which the following is a specification.

This invention relates to a thrust bearing adapted for use in controlling the longitudinal movement or end play of a rotating shaft.

It is the object of my invention to improve the construction of such bearings, attaining thereby economy of manufacture and increased efficiency in operation, particularly when in the care of unskilled workmen.

With this object in view one feature of my invention relates to the provision in a thrust bearing of improved adjusting devices by the use of which the necessary adjustment of the bearing may be most easily accomplished.

A further feature of my invention relates to the provision of a thrust bearing in which all of the operating parts are fully inclosed and in which the adjustment of the bearing may be accomplished without displacing any part of the inclosing casing.

A still further feature of my invention relates to a construction of bearing in which the parts which receive the greatest wear during the operation of the bearing may be very easily and cheaply replaced.

A preferred form of my invention is shown in the drawings, in which—

Figure 1 is a sectional elevation of my improved bearing; and Fig. 2 is a detail view of the flange-engaging member.

Referring to Fig. 1, I have shown a shaft 10 rotatable in a cylindrical bearing 11, which bearing may be integral with or secured to a casing or support 12. The cylindrical bearing 11 is provided with a flange engaging surface 13 at one end thereof, this surface being shown as radial in the drawing.

The surface 13 is engaged by a flange carried by the shaft 10. In the preferred form of my invention, this flange takes the shape of a disk 14 mounted upon a threaded stud 15 integral with and extending beyond the end of the shaft 10. The disk 14 may be retained upon the stud 15 by a nut 16 and a check nut 17, relative rotation of the disk and shaft being prevented by a pin 18 fixed in the end of the shaft and extending through a hole in the disk 14.

The casing or support 12 is provided with an externally threaded annular portion 19 extending beyond the end of the bearing. This annular portion forms a support for an inclosing member or cap 20 which is internally threaded to fit said annular portion and which is designed to be brought closely into firm engagement with the end surface 19$^a$ thereof.

The inner portion of the cap 20 is bored out to form a cylindrical bearing surface 21 within which is slidably mounted a cup-shaped flange-engaging member 22. The member 22 is prevented from angular movement relative to the cap 20 by a key 23 secured to the cap and engaging a keyway 24 formed in the outer portion of the member 22. The end surface 25 of the member 22 is adapted to engage the outer surface of the disk 14 previously described.

The longitudinal position of the member 22 is controlled by a set screw 26 projecting through the end of the cap 20 and held in adjusted position by a check nut 27. Suitable oil grooves 28 may be formed in the flange engaging surface 25 of the member 22 and an oil hole 29 extending through one side wall of the member 22 permits the passage of oil from an oil supply pipe 30 to the engaging surfaces of the thrust bearing. As the member 22 is non-rotatable relatively to the cap 20, the hole 29 is always alined with the pipe 30.

With this construction it will be seen that all dust and dirt are fully excluded from the bearing and that the adjustment of the end play may be accomplished by merely turning the set screw 26 without in any way disturbing the remaining portions of the bearing. Furthermore, the wearing parts 14 and 22 are of simple construction and may be easily and cheaply replaced when worn.

The thrust bearing, while capable of general application, is particularly adapted for controlling the end play of the grinding wheel shaft in a heavy grinding machine. Such a shaft is subject to considerable changes in temperature, causing longitudinal or axial expansion and contraction of the shaft. In a common construction of bearings for such a shaft, the end play is taken up at the opposite ends of a journal bearing of considerable length, and the changes in the length of the shaft between the ends of said bearing render uniform adjustment under different temperature conditions impossible.

In the bearing herein described, the two elements which control the end play engage the opposite faces of the disk 14, the axial expansion and contraction of which is entirely negligible.

Having thus described my invention, it will be evident that changes and modifications can be made therein by those skilled in the art without departing from the spirit and scope thereof as set forth in the claims, and I do not wish to be otherwise limited to the details herein disclosed, but

What I claim is:—

1. A thrust bearing having, in combination, a fixed cylindrical bearing, a shaft having an end flange and rotatable in said bearing, a cap fixed with relation to said bearing and inclosing the flanged end of said shaft, a flange-engaging member slidable in said cap, and means to move said member longitudinally of said cap into operative relation with said flange on said shaft.

2. A thrust bearing having, in combination, a casing, a cylindrical shaft bearing within said casing, a shaft rotatable in said bearing and having adjacent one end a radial flange engaging an end surface of said bearing, a cap fixed to said casing and inclosing the flanged end of said shaft, a flange-engaging member slidable in said cap but non-rotatable therein, and means for adjusting said member longitudinally in said cap.

3. A thrust bearing having, in combination, a fixed cylindrical bearing having a flange engaging end surface, a shaft rotatable in said bearing and having a disk removably secured to one end thereof and forming a flange projecting beyond the periphery of said shaft, a cap secured to said bearing, and a cup-shaped member slidable but non-rotatable in said cap and having an end surface effective to engage the outer surface of said disk, whereby the end play of said shaft in both directions is controlled.

In testimony whereof I have hereunto set my hand.

CHARLES H. NORTON.